(12) United States Patent (10) Patent No.: US 7,292,394 B2
Leu (45) Date of Patent: Nov. 6, 2007

(54) LENS SYSTEM

(75) Inventor: Charles Leu, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 17 days.

(21) Appl. No.: 11/321,196

(22) Filed: Dec. 29, 2005

(65) Prior Publication Data

US 2006/0193056 A1 Aug. 31, 2006

(30) Foreign Application Priority Data

Feb. 28, 2005 (CN) .................. 2005 1 0334056

(51) Int. Cl.
*G02B 3/00* (2006.01)
(52) U.S. Cl. ..................... 359/654; 359/652
(58) Field of Classification Search ......... 359/652, 359/654, 655
See application file for complete search history.

(56) References Cited

U.S. PATENT DOCUMENTS 4,215,914 A * 8/1980 Muchel et al. ............. 359/654
6,147,809 A * 11/2000 Corbasson et al. ......... 359/642

* cited by examiner

*Primary Examiner*—Scott J. Sugarman
*Assistant Examiner*—Darryl J. Collins
(74) *Attorney, Agent, or Firm*—Morris Manning Martin LLP; Tim Tingkang Xia, Esq.

(57) ABSTRACT

A lens system (10) includes a main lens (12) having a first surface (12*a*) and a second surface (12*b*) configured opposite to each other, a first film lens (11) and a second film lens (13) respectively secured on the first surface and the second surface of the main lens. The first film lens and/or the second film lens are radial gradient index lenses, which refractive index progressively decreases from the centers to the outmost sides. All of the main lens, the first film lens and the second film lens are converging lens, and the axles of them are overlapped one to another.

9 Claims, 1 Drawing Sheet

LENS SYSTEM

BACKGROUND

1. Field of the Invention

The present invention relates to optical lens systems, and particularly to a compact optical lens system.

2. Related Art

Optical lenses are basic elements for various optical apparatuses. A typical optical lens is a ground or molded piece of glass, plastic, or other transparent material. Either or both of opposite surfaces of the optical lens are curved, whereby light rays are refracted so that they converge or diverge to form an image. A combination of two or more such optical lenses used to form an image for viewing or photographing is called an optical lens system.

A typical conventional optical lens system contains two or more separate optical lenses. For obtaining optimal image quality, optical centers of the lenses should be precisely aligned one to another, and subsequently secured in a barrel to permanently maintain the optimal alignment. Mass production of optical lens systems using such a process is generally very expensive. In addition, products such as video or still camera devices are expected to be as slim and compact as possible. It is difficult for an optical lens system comprising separate lenses to satisfactorily meet these requirements.

Therefore, what is needed is to provide a compact optical lens system that takes up less space than a conventional lens system having separate optical lenses.

SUMMARY

Various embodiments of the present lens system each include a plurality of lens pieces joined together to form a single whole.

In one embodiment, a lens system includes a main lens having a first surface and a second surface opposite to each other, and a first film lens and a second film lens respectively secured on the first surface and the second surface of the main lens. The first film lens and the second film lens are radial gradient index lenses, wherein a refractive index progressively decreases from a center to an outmost periphery of the lens. The main lens, the first film lens and the second film lens are all converging lenses, with optical axes thereof being collinear.

An advantage of the present lens system is that it is compact, thus making an optical device using the lens system slimmer and lighter.

Another advantage is that the lens system does not need a complicated process for aligning each of separate lenses with the others, thus reducing production costs.

BRIEF DESCRIPTION OF THE DRAWINGS

The above-mentioned and other features and advantages of the present lens system, and the manner of attaining it, will become more apparent and the invention will be better understood by reference to the following description of its embodiments taken in conjunction with the accompanying drawings.

Figure 1:
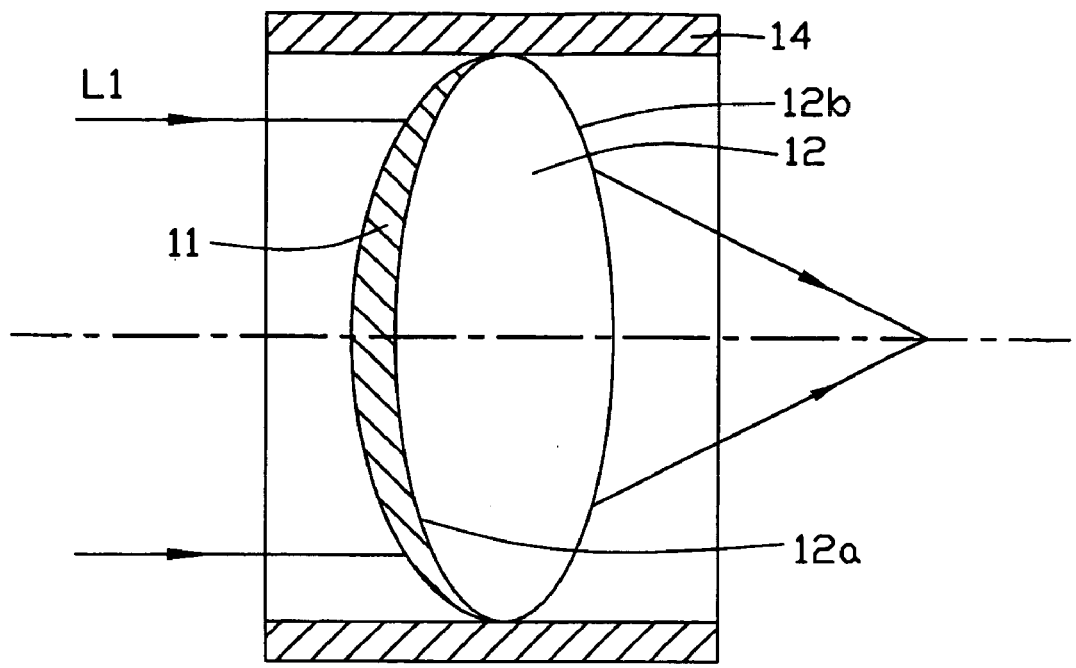
FIG. 1 is a schematic, cross-sectional view of a lens system according to one embodiment of the present invention.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Reference will now be made to the drawings to describe the preferred embodiments of the present optical lens system in detail.

Referring now to the drawings, and more particularly to FIG. 1, there is shown an optical lens system 10 according to one embodiment of the present invention. The optical lens system 10 includes a first film lens 11, and a main lens 12 having a first surface 12a and an opposite second surface 12b. The first film lens 11 is secured on the first surface 12a of the main lens 12. The first film lens 11 is a radial gradient index lens. A refractive index of the first film lens 11 progressively decreases from a center thereof to an outmost periphery thereof. Both the first film lens 11 and the main lens 12 are converging lenses. The first film lens 11 is configured to have an optical axis thereof collinear with an optical axis of the main lens 12.

In use, a light L1 incident to the optical lens system 10 is firstly converged by the thin film lens 11, and thereafter converged by the main lens 12. The light L1 is thereby focused to a point more proximate to the main lens 12 than focal points of the individual film lens 11 and main lens 12.

Figure 2:
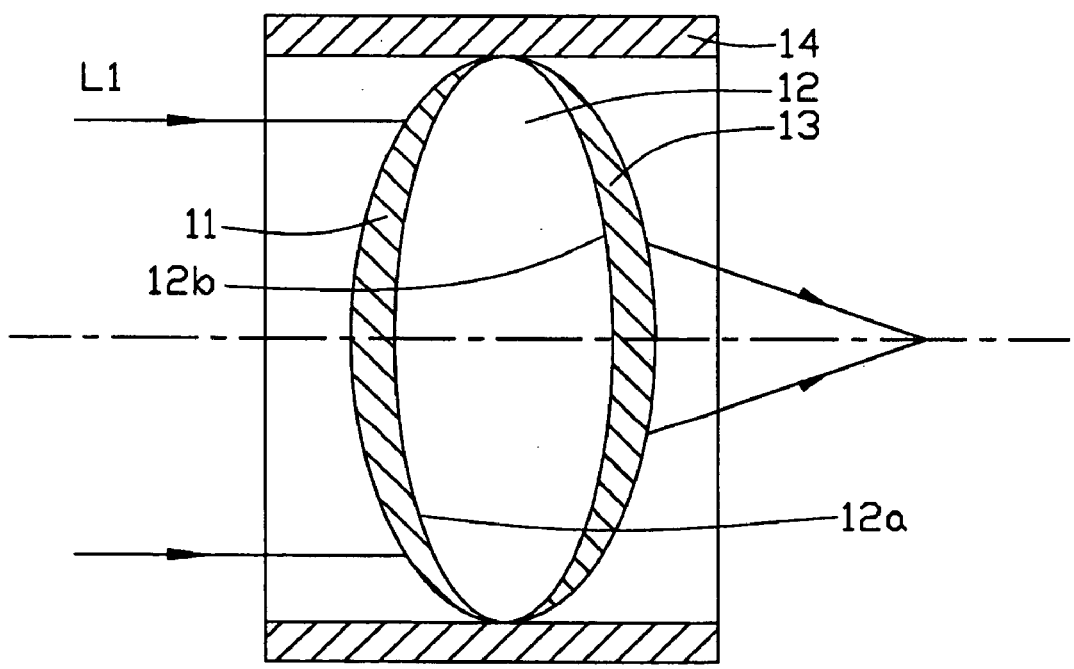
FIG. 2 is a schematic, cross-sectional view of a lens system according to another embodiment of the present invention.

Referring to FIG. 2, there is shown an optical lens system 20 according to another embodiment of the present invention. Unlike in the optical lens system 10, the optical lens system 20 further includes a second film lens 13 secured on the second surface 12b of the main lens 12. The second film lens 13 is configured to have an optical axis thereof collinear with the optical axes of both the first film lens 11 and the main lens 12. The second film lens 13 is advantageously a radial gradient index lens. A refractive index of the second film lens 13 progressively decreases from a center thereof to an outmost periphery thereof. In the illustrated embodiment, the second film lens 13 is a converging lens.

In use, the second film lens 13 provides further converging of the light L1 outputted from the main lens 12, thereby further shortening the imaging focusing distance of the optical lens system 20 as compared to that of the optical lens system 10.

According to the foregoing embodiments, one or two film lenses can be provided according to application requirements. Each film lens is integrated with the main lens, unlike with the above-described conventional optical lens system that has two or three separate lenses. Thus the optical lens system is compact and occupies less space, and also eliminates the need for a process of collimating separate lenses during assembly thereof.

The foregoing film lenses 11, 13 can be made of either glass material or plastic material. The materials selected for making the film lenses 11, 13 are transparent in a wavelength band or bands according to their practical application. For example, in devices (e.g., still cameras or video cameras) for capturing images in the visible wavelength band, the film lenses 11, 13 are made of one or more materials that are transparent in the visible wavelength band. In devices for capturing images in the infrared wavelength band, the film lenses 11, 13 are made of one or more materials that are transparent in the infrared wavelength band. In devices for capturing images in more than one wavelength band, the film lenses 11, 13 are made of one or more materials that are transparent in the respective wavelength band that they are correspondingly applied in.

Preferably, the foregoing film lenses 11, 13 and the main lens 12 are separately formed prior to being attached together to obtain the unified optical lens system 10 or 20. To attach each of the film lens 11 and the film lens 13 to the main lens 12, a very thin layer of glue (not shown) is advantageously employed. Since the layer of glue is very thin, any effect that the glue may have on the characteristics of the optical lens system 10 or 20 can be disregarded.

Alternatively, the foregoing film lenses 11, 13 can be formed on the main lens 12 by a deposition process. The deposition process can for example include a chemical vapor deposition method, a physical vapor deposition method, or an ion implantation method.

It is to be noted that although the first and second film lenses 11, 13 and the main lens 12 as set forth in the foregoing embodiments are exemplarily described and illustrated as being converging lenses, in alternative embodiments of the present invention, any one or more of the lenses 11, 13, 12 may instead be a diverging lens according to the requirements of various applications. Furthermore, when the foregoing lens system 10 or 20 is used in an optical device, a barrel 14 is usually needed for holding the lens system 10, 20 in place. That is, the lens system 10, 20 can be secured in the barrel 14 in order to provide a desired optical device.

It is to be further noted that although the foregoing embodiments exemplarily describe and illustrate each of the first film lens 11, the main lens 12 and the second film lens 13 as being either a spherical convex lens or a converging radial gradient refractive lens, in alternative embodiments of the present invention, any one or more of the lenses 11, 12, 13 may instead be for example a planar lens, an aspherical lens, an axial gradient refractive lens, or a diverging lens.

Finally, while the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A lens system comprising:
    a first film lens, the first film lens being a radial gradient index lens, wherein an optical refractive index progressively decreases from a center to an outmost periphery of the first film lens; and
    a main lens having a first surface and a second surface opposite to each other, the first film lens being secured on the first surface of the main lens;
    wherein the first film lens and the main lens are converging lenses, and optical axes of the first film lens and the main lens are collinear.

2. The lens system as described in claim 1, farther comprising a second film lens, the second film lens being secured on the second surface of the main lens.

3. The lens system as described in claim 2, wherein the second film lens is a converging lens, and an optical axis of the second film lens is collinear with the optical axes of the first film lens and the main lens.

4. The lens system as described in claim 3, wherein the second film lens is a radial gradient index lens, wherein an optical refractive index progressively decreases from a center to an outmost periphery of the second film lens.

5. The lens system as described in claim 2, wherein the main lens is a radial gradient index lens, wherein an optical refractive index progressively decreases from a center to an outmost periphery of the main lens.

6. A lens system, comprising:
    a main lens having a first surface and a second surface opposite to each other; and
    a first film lens, the first film lens being a radial gradient index lens, wherein an optical refractive index progressively decreases from a center to an outmost periphery of the first film lens, and the first film lens is bonded with the first surface of the main lens and coaxial with the main lens whereby a first compound lens including the first film lens and the main lens is formed, and a focal length of the first compound lens is shorter than that of the individual first film lens and the individual main lens.

7. The lens system as described in claim 6, wherein the first film lens is a convex-concave film lens.

8. The lens system as described in claim 6, further comprising a second film lens, the second film lens being bonded with the second surface of the main lens and coaxial with the main lens whereby a second compound lens including the second film lens and the first compound lens is formed, and a focal length of the second compound lens being shorter than that of the first compound lens.

9. The lens system as described in claim 8, wherein the second film lens is a radial gradient index lens, and an optical refractive index progressively decreases from a center to an outmost periphery of the second film lens.

* * * * *